(12) United States Patent
Maeda

(10) Patent No.: US 8,309,243 B2
(45) Date of Patent: *Nov. 13, 2012

(54) CYLINDRICAL ALKALINE STORAGE BATTERY

(75) Inventor: Taishi Maeda, Takasaki (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 2732 days.

This patent is subject to a terminal disclaimer.

(21) Appl. No.: 10/909,343

(22) Filed: Aug. 3, 2004

(65) Prior Publication Data

US 2005/0031950 A1 Feb. 10, 2005

(30) Foreign Application Priority Data

Aug. 4, 2003 (JP) ................................. 2003-286325

(51) Int. Cl.
- *H01M 4/00* (2006.01)
- *H01M 10/26* (2006.01)
- *H01M 4/76* (2006.01)

(52) U.S. Cl. .......... 429/94; 429/206; 429/164; 429/241

(58) Field of Classification Search ................ 429/94, 429/206, 164, 241
See application file for complete search history.

(56) References Cited

U.S. PATENT DOCUMENTS

| | | | |
|---|---|---|---|
| 5,965,295 A * | 10/1999 | Bando et al. | 429/223 |
| 6,051,333 A * | 4/2000 | Nagai et al. | 429/94 |
| 6,248,475 B1 * | 6/2001 | Hayashida et al. | 429/218.2 |
| 6,287,719 B1 * | 9/2001 | Bailey | 429/94 |
| 6,869,723 B2 * | 3/2005 | Yamaguchi | 429/94 |

FOREIGN PATENT DOCUMENTS

| | | | |
|---|---|---|---|
| JP | 10-199520 | | 7/1998 |
| JP | 10-255788 A | | 9/1998 |
| JP | 3056521 B2 | * | 7/2000 |
| JP | 2000-311704 A | | 11/2000 |
| JP | 2000311704 A | * | 11/2000 |
| JP | 2001-23681 A | | 1/2001 |

OTHER PUBLICATIONS

Japanese Office Action dated Jan. 8, 2008 of JP 2003-286325.

* cited by examiner

*Primary Examiner* — Barbara Gilliam
*Assistant Examiner* — Edu E Enin-Okut
(74) *Attorney, Agent, or Firm* — Westerman, Hattori, Daniels & Adrian, LLP

(57) ABSTRACT

A cylindrical alkaline storage battery has a cylindrical case which contains an electrode assembly and an alkaline electrolyte. The assembly is formed by spirally winding a negative plate, a positive plate and a separator. The negative plate has a substrate having through holes and an active material layer which is disposed on the substrate and has an inner layer, an outer layer and a filler filled in the through holes. Each of the inner layer and outer layers has an overlapping portion which overlaps the adjacent positive plate via the separator. The filler has filling portions distributed in an area of the substrate that is covered by the overlapping portion of the inner and outer layers. The total amount of the active material contained in the overlapping portions and the filling portions ranges from 75% of the total amount of the active material in the negative plate to 100%.

14 Claims, 5 Drawing Sheets

CYLINDRICAL ALKALINE STORAGE BATTERY

This nonprovisional application claims priority under 35 U.S.C. §119(a) on Patent Application No. 2003-286325 filed in Japan on Aug. 4, 2003, the entire contents of which are hereby incorporated by reference.

BACKGROUND OF THE INVENTION

1. Field of the Invention

The present invention relates to a cylindrical alkaline storage battery, and, more particularly, to a cylindrical alkaline storage battery suitable for achieving a high capacity.

2. Description of the Related Art

Alkaline batteries available include, for example, a nickel cadmium secondary battery and a nickel hydrogen secondary battery depending on the types of active materials contained in the batteries. Some of those alkaline batteries are of a cylindrical type which has a cylindrical case. The case is sealed with a lid having a relief valve and accommodates an electrode assembly together with an alkaline electrolyte. The electrode assembly is formed by winding a belt-like negative plate and a belt-like positive plate spirally with a separator in between and are contained in the case while that part of the negative plate which is wound around the outermost one of the electrode assembly contacts the inner wall of the case.

The positive plate, which is called a nickel electrode, is formed by filling a positive mixture in a nickel porous member having a three-dimensional mesh structure. The positive mixture includes nickel hydroxide particles as a positive active material, additive particles and a binder which binds those particles. The negative plate is formed by covering both sides of a metal sheet as a negative substrate with a hydrogen absorbing alloy layer as a negative active material layer. The metal sheet has through holes in which the negative active material is filled. The hydrogen absorbing alloy layer and a filler includes hydrogen absorbing alloy particles which can absorb and desorb hydrogen as a negative active material, and a binder which binds the hydrogen absorbing alloy particles. While the capacity of each of the positive plate and the negative plate is defined by the amount of the active material or the amount of the hydrogen absorbing alloy contained therein, the battery capacity is defined by the capacity of the positive electrode. This is because the capacity of the negative electrode in this type of cylindrical alkaline storage battery is set greater than the capacity of the positive electrode in order to prevent the inner pressure from rising by reducing an oxygen gas produced in the positive plate with the negative plate when the battery is overcharged.

Recently, there have been strong demands of a higher capacity or an improvement on the volume energy density for cylindrical alkaline storage batteries of this type, particularly, cylindrical alkaline storage batteries of AA size compatible with AA-size dry cells. To increase the battery capacity, the capacity of the positive electrode should be increased. Specifically, the amount of the positive active material should be increased or the ratio of usage of the positive active material should be improved. One known way to increase the amount of the positive active material is to increase the length, thickness and area of the positive plate and the filling density of the positive mixture in the porous member. For example, Japanese Patent Laid-Open Publication No. Hei 10-199520 discloses a cylindrical alkaline storage battery which achieves a high capacity by setting the thickness of a nickel electrode equal to or greater than 0.8 mm.

However, the service life of the battery becomes shorter when the cylindrical alkaline storage battery described in the publication is adapted to an AA-size cylindrical alkaline storage battery whose case has an outside diameter of 13.5 mm to as large as 14.5 mm and whose positive plate is made as thick as 0.95 mm or thicker for a higher capacity so that the volume energy density becomes 340 Wh/l or higher.

Before going into the detailed description of the problem, definitions of terms to be used hereinafter will be given below.

Capacity ratio: the ratio of the capacity of the entire negative plate to the capacity of the positive electrode Non-overlapping portion: the portion of the negative active material layer which does not overlap the positive plate via the separator Overlapping portion: the portion of the negative active material layer which overlaps the adjoining positive plate via the separator Ratio of the non-opposing portion of the negative plate: the occupying ratio of the amount of the negative active material contained in the non-overlapping portion of the negative active material layer and the filler distributed in an area of the negative substrate that is covered by the non-overlapping portion on both sides thereof to the total amount of the negative active material Opposing capacity ratio: the ratio of the capacity of the overlapping portion and the filler distributed in an area of the negative substrate that is covered by the overlapping portion on at least one side thereof in the negative plate and the through holes to the capacity of the positive electrode Capacity-electrolyte ratio: the ratio of the volume of the alkaline electrolyte to 0.2 C capacity As the capacity of the positive electrode is increased by making the positive plate thicker, the capacity ratio decreases, thereby reducing the amount of the negative active material contained in the overlapping portion of the negative active material layer (hydrogen absorbing alloy layer). As the battery reaction mainly progresses between the positive active material and the overlapping portion of the negative active material layer at the time of charge/discharge, the battery reaction does not progress smoothly if the amount of the negative active material contained in the overlapping portion is small.

In a battery with the ratio of the non-opposing portion of the negative plate of 29%, for example, when the capacity ratio drops to 1.4 or lower, the opposing capacity ratio becomes 1.00 or less, so that the capacity of the negative electrode substantially becomes smaller than the capacity of the positive electrode.

When the opposing capacity ratio becomes 1.00 or less, it becomes impossible to exchange protons at the shortest distance at the time the battery reaction occurs. So the reaction is made non-uniform, thereby lowering the discharge characteristics. Further, the time for the oxygen gas that has been produced in the positive plate at the time of charging to pass through the separator, reach the negative plate and be reduced becomes longer, thus increasing the inner pressure of the battery. This actuates the relief valve, so that the alkaline electrolyte leaks out. When charge/discharge is repeated, therefore, the battery life becomes shorter due to two factors: early and local deterioration of the active material caused by the non-uniform reaction and the leakage of the alkaline electrolyte caused by an increase in the inner pressure of the battery.

In addition, when the capacity of the positive plate or the positive capacity increases, the capacity-electrolyte ratio drops. When the capacity-electrolyte ratio becomes 0.85 ml/Ah or less, the amount of the electrolyte becomes short at the portion where the positive plate and the negative plate overlap each other via the separator. This increases the electric resistance, lowering the discharge characteristic.

Because the alkaline electrolyte mainly exist in the form of being contained in the positive plate, the negative plate and the separator in entirety in the battery, some of the alkaline electrolyte is contained in the non-overlapping portion of the negative plate which does not directly contribute to the battery reaction and the separator adjoining to the non-overlapping portion. Accordingly, the amount of the alkaline electrolyte which is contained in the positive plate, the overlapping portion of the negative plate where the battery reaction takes place, and the separator sandwiched therebetween is what is obtained by subtracting the amount of the alkaline electrolyte contained in the non-overlapping portion of the negative plate from the total amount of the alkaline electrolyte. In the case where the capacity-electrolyte ratio becomes 0.85 ml/Ah or less, if a part of the alkaline electrolyte is contained in the non-overlapping portion of the negative plate, the amount of the alkaline electrolyte that is present in the place of the battery reaction becomes short. This increases the electric resistance between the positive plate and the negative plate, thus lowering the discharge characteristic.

When continuous charging takes place at a low temperature, the positive plate is expanded to absorb the electrolyte. In a battery which has a small amount of the electrolyte, therefore, the discharge performance after continuous charging drops, causing a significant voltage drop at the initial discharge stage. This low-temperature continuous charge characteristic also considerably decreases when the capacity-electrolyte ratio becomes 0.85 ml/Ah or less.

SUMMARY OF THE INVENTION

Accordingly, it is an objective of the invention to provide a cylindrical alkaline storage battery and a cylindrical nickel hydrogen secondary battery, which is suitable for achieving a high capacity and suppresses a reduction in low-temperature continuous charge characteristic as well as reductions in battery life and discharge characteristic and has a high volume energy density.

To achieve the object, according to one aspect of the invention, there is provided a cylindrical alkaline storage battery which comprises: a cylindrical case having a conductivity and an outside diameter within a range from 13.5 mm to 14.5 mm; and an electrode assembly contained in the case together with an alkaline electrolyte, the electrode assembly including a belt-like negative plate and a belt-like positive plate, the negative plate and positive plate being spirally wound with a separator intervened therebetween, the negative plate forming an outermost portion of the electrode assembly and being in contact with an inner wall of the case, wherein the positive plate has a thickness of 0.95 mm or greater, the negative plate includes: a negative substrate made of a metal conductive sheet and having a plurality of through holes, an inner surface and an outer surface in view of a radial direction of the electrode assembly, and a negative active material layer deposited on the negative substrate and containing a negative active material, the negative active material layer including, an inner layer covering the inner surface of the negative substrate and having an overlapping portion overlapping the positive plate adjacent thereto via the separator, an outer layer covering the outer surface of the negative substrate and having an overlapping portion overlapping the positive plate adjacent thereto via the separator, and a filler filled in the through holes of the negative substrate, the filler having filling portions distributed in an area of the negative substrate that is covered by the overlapping portion of the inner layer and the outer layer on at least one side thereof, and a total amount of the negative active material contained in the overlapping portions of the inner and outer layers and the filling portions of the filler ranges from 75% to 100% of a total amount of the negative active material contained in the negative plate.

As the thickness of the positive plate is 0.95 mm or greater, the cylindrical alkaline storage battery with the structure is suitable for achieving a high capacity.

In addition, in the structure, the ratio of the total amount of the negative active material contained in the overlapping portions of the inner layer and the outer layer and the filler distributed in the area of the negative substrate that is covered by the overlapping portion on at least one side thereof to the total amount of the negative active material contained in the entire negative plate (hereinafter called "ratio of the opposing portion") is set in a range from 75% to 100%, thereby suppressing a reduction in battery life.

The negative plate has a portion where the positive plate is placed only on one surface side via the separator and a portion where the positive plate is placed on neither surface side. Therefore, the inner layer and outer layer that cover the individual sides of the negative substrate have an overlapping portion which overlaps the adjoining positive plate via the separator and a non-overlapping portion which does not overlap the positive plate. The non-overlapping portion contributes to the battery reaction less than the overlapping portion. Accordingly, the ratio of the opposing portion is set in a range from 75% to 100% in the structure, so that the amount of the negative active material contained in the non-overlapping portion is limited, thereby securing the amount of the negative active material contained in the overlapping portion. In the cylindrical alkaline storage battery with the structure, therefore, the battery reaction progresses uniformly over the entire positive plate at the time of charging/discharging. This prevents early local degradation of the active material and leakage of the alkaline electrolyte which is caused by a rise in the inner pressure of the battery originated from the delayed reaction of reducing an oxygen gas, thereby suppressing shortening of the battery life.

As a preferable mode of the structure, each of the inner layer and outer layer has a non-overlapping portion which does not overlap the positive plate via the separator, and an area of 50% or more of the non-overlapping portions of the inner and outer layers has a thickness equal to or less than half a thickness of the overlapping portions of the inner and outer layers.

As a preferable mode of the structure, each of the inner layer and outer layer has a non-overlapping portion which does not overlap the positive plate via the separator, and an area of 50% or more of the non-overlapping portions of the inner and outer layers contains an amount of the negative active material per unit area equal to or less than half an amount of the negative active material contained in the overlapping portions of the inner and outer layers per unit area.

According to the structure, even if the capacity-electrolyte ratio is 0.85 ml/Ah or less, the ratio of the opposing portion set in a range from 75% to 100% can secure the amount of the alkaline electrolyte contained in the portion where the positive plate and the negative plate overlap each other via the separator. Therefore, the structure prevents the electric resistance between the positive plate and the negative plate from getting higher, thus preventing a reduction in discharge characteristic and a reduction in low-temperature continuous charge characteristic.

As a preferable mode of the structure, the electrode assembly has a cavity in a center thereof, the cavity having an inside diameter equal to or less than 30% of the outside diameter of the case.

According to the mode, as the inside diameter of the cavity is 30% or less than the outside diameter of the case, shortening of the battery life is suppressed more reliably.

When the ratio of the inside diameter of the cavity to the outside diameter of the case exceeds 30%, an oxygen gas produced in the positive plate is likely to remain in the cavity at the time of charging, delaying the oxygen-gas reducing reaction in the negative plate. When the oxygen-gas reducing reaction is delayed, the inner pressure rises, actuating the relief valve so that the alkaline electrolyte leaks out, shortening the battery life. According to the mode, therefore, while the inside diameter of the cavity is reduced to 30% of the outside diameter of the case or less, the space for temporary storage of the oxygen gas, which corresponds to the reduction in cavity, is dispersed inside the battery. This permits efficient progression of the oxygen-gas reducing reaction using the whole negative plate, preventing the oxygen-gas reducing reaction from being delayed. This mode therefore prevents leakage of the alkaline electrolyte which would otherwise be originated from the actuation of the relief valve caused by a rise in inner pressure, and thus suppresses a reduction in battery life more surely.

As a preferable mode of the structure, the case has an open end and a lid plate fixed to the open end; and the battery further comprises a positive lead laid out between the electrode assembly and the lid plate, the positive lead having an end portion welded to one side of the positive plate and a bent portion bent between the electrode assembly and the lid plate, wherein a percentage of a value obtained by dividing a first value by a second value ranges from 90% to 100%, the first value being obtained by subtracting a lateral cross-sectional area of the cavity from a cross-sectional area of the electrode assembly, the second value being obtained by subtracting the cross-sectional area of the cavity from a cross-sectional area of inner space of the case.

As the percentage, herein after called "the ratio of the cross-sectional area of the electrode assembly", is set equal to or greater than 90% in the mode, an increase in inner resistance is further prevented.

When the ratio of the cross-sectional area of the electrode assembly is low, the compressing force applied to the electrode assembly by the inner wall of the case from both radial sides becomes smaller, so that the degree of constriction of the electrode assembly becomes lower. When the positive lead whose end portion is welded to one side of the positive plate and the lid plate is placed in the opening edge of the case with the a low degree of constriction, a large load is applied to the welded place of the positive plate where the end portion of the positive lead is welded. Then, the positive plate breaks at the welded place, resulting in an increased inner resistance. In this mode, therefore, the ratio of the cross-sectional area of the electrode assembly is set equal to or greater than 90% to increase the compressing force applied to the electrode assembly, thereby making the degree of constriction of the electrode assembly greater. This allows the welded place of the positive plate to be held by the negative plate from both radial sides via the separator. This prevents deformation of the positive plate at the welded place at the time the positive lead is bent. Consequently, rupture of the positive plate at the place where the end of the positive lead of the positive plate 24 is welded is prevented in the mode, thereby preventing an increase in inner resistance.

Further, as a preferable mode of the structure, the negative plate includes a hydrogen absorbing alloy as the negative active material, and the positive plate includes a metal substrate having a conductive three-dimensional mesh-like frame and nickel hydroxide particles, as a positive active material, filled in the metal substrate.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

An AA-size cylindrical nickel hydrogen secondary battery according to one embodiment of the invention will be described in detail below with reference to the accompanying drawings.

Figure 1:
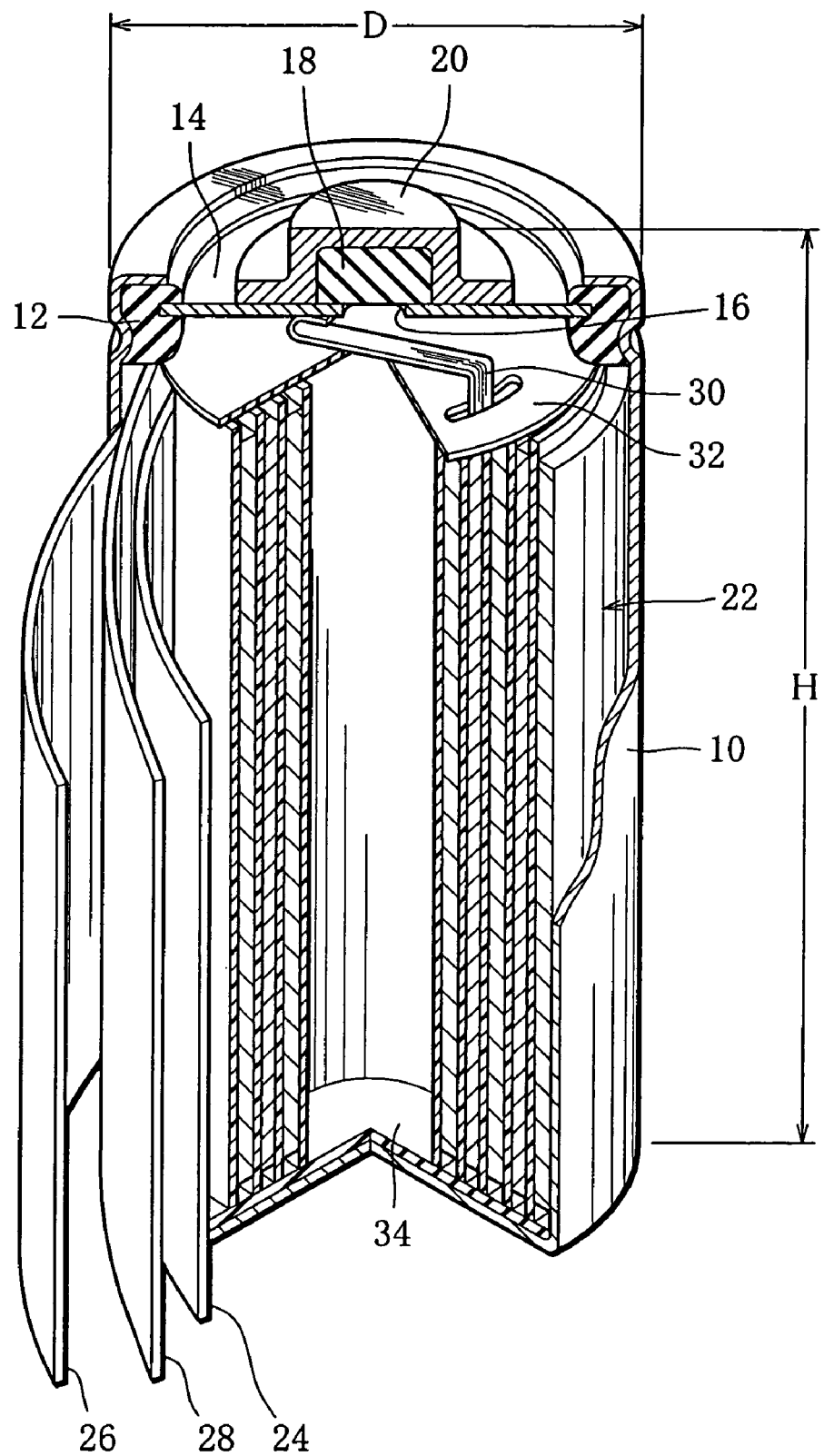
FIG. 1 is a partly cutaway perspective view illustrating a cylindrical nickel hydrogen secondary battery according to one embodiment of the invention.

As shown in FIG. 1, the battery has a case 10 which has a bottomed cylindrical shape with one end open. The case 10 has an outside diameter D set in a range from 13.5 mm to 14.5 mm. The case 10 has a conductivity and serves as a negative terminal. A conductive lid plate 14 is placed in the opening of the case 10 via a ring-shaped insulating packing 12 and the insulating packing 12 and the lid plate 14 are secured in the opening by caulking the edge of the opening.

The lid plate 14 has a vent hole 16 in the center with a rubber valve element 18 placed on the outer surface of the lid plate 14, blocking the vent hole 16. A cylindrical positive terminal 20 with a flange which covers the valve element 18 is fixed to the outer surface of the lid plate 14, and protrudes from the case 10 in the axial direction on the open end side. The positive terminal 20 presses the valve element 18 against the lid plate 14. Normally, the case 10 is closed together with the insulating packing 12 and the valve element 18 with the lid plate 14. When a gas is produced in the case 10 and its inner pressure of the battery rises, the valve element 18 is compressed, causing the gas to be discharged from the case 10 through the vent hole 16. That is, the lid plate 14, the valve element 18 and the positive terminal 20 form a relief valve which actuates at a predetermined inner pressure.

The length from the distal end of the positive terminal 20 to the bottom of the case 10, i.e., the height, H, of the battery lies within a range from 49.2 mm to 50.5 mm. The volume, Vb, of the battery is taken as equal to the volume of a cylinder with the outside diameter D and the height H and is defined by the following equation.

$$Vb = \pi (D/2)^2 \times H$$

Approximately cylindrical electrode assembly 22 are contained in the case 10 and the outermost portion of the electrode assembly 22 directly contacts the inner wall of the case 10. The electrode assembly 22 comprise a positive plate 24, a negative plate 26 and a separator 28 and are formed by spirally winding the positive plate 24 and the negative plate 26 via the separator 28. That is, the positive plate 24 and the negative plate 26 are overlaid each other alternately in the radial direction of the electrode assembly 22 via the separator 28. The negative plate 26 is wound around the outermost portion of the electrode assembly 22 and is electrically connected to the case 10 at the outermost portion of the electrode assembly 22.

A positive lead 30 is placed between one end of the electrode assembly 22 and the lid plate 14 in the case 10, and both ends of the positive lead 30 are welded to the positive plate 24 and the lid plate 14. Therefore, the positive terminal 20 is electrically connected to the positive plate 24 via the positive lead 30 and the lid plate 14. More specifically, the positive lead 30 has a belt-like shape and is bent between the electrode assembly 22 and the lid plate 14 and contained in the case in that form when the lid plate 14 is placed in the opening of the case 10. That end portion of the positive lead 30 which lies on the electrode assembly 22 side is welded in such a way as to be in a plane contact with one side of the positive plate 24. A circular insulating member 32 is placed between the lid plate 14 and the electrode assembly 22 and the positive lead 30 extends through a slit provided in the insulating member 32. A circular insulating member 34 is likewise placed between the electrode assembly 22 and the bottom of the case 10.

Figure 2:
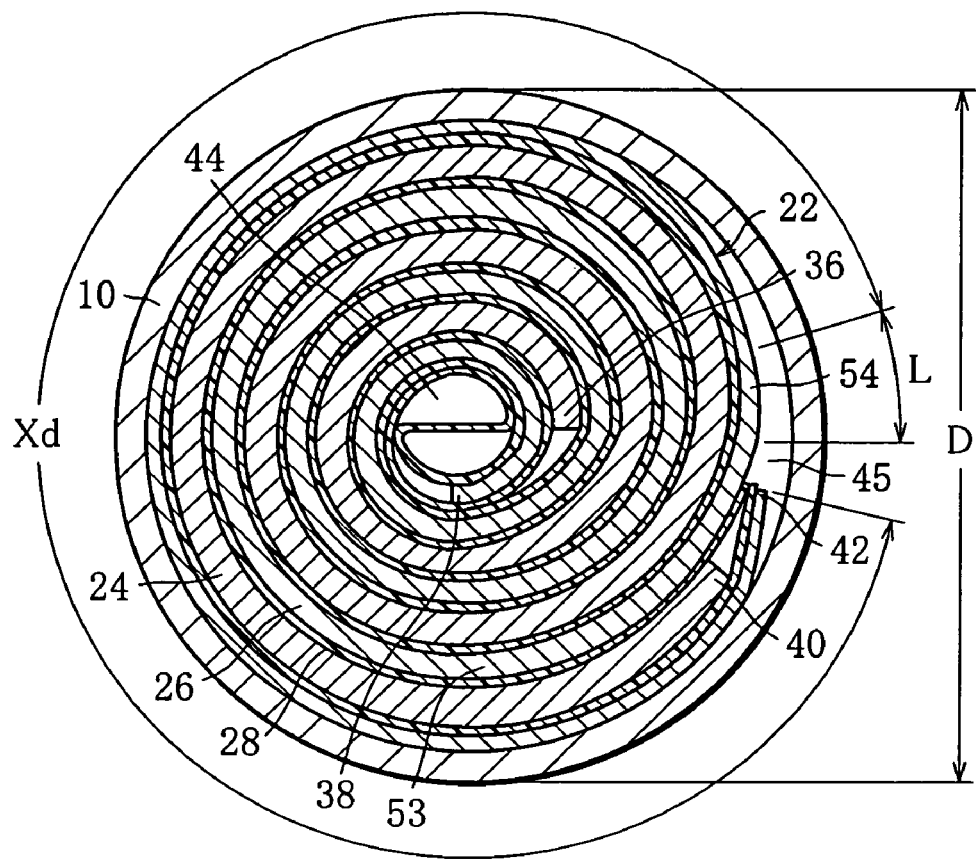
FIG. 2 is a lateral cross-sectional view of the battery in FIG. 1.
Figure 3A:
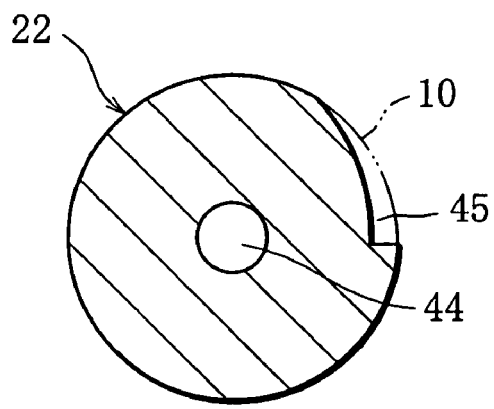
FIG. 3A is an exemplary diagram showing the lateral cross-sectional area of electrode assembly in the battery in FIG. 1.
Figure 3B:
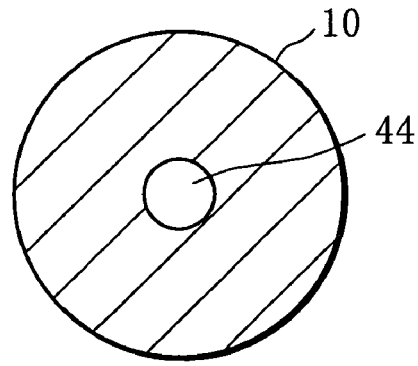
FIG. 3B is an exemplary diagram showing a lateral cross-sectional area obtained by subtracting the cross-sectional area of a cavity of the electrode assembly from the cross-sectional area of the inside of a case.

More specifically, the electrode assembly 22 are formed by spirally winding the belt-like positive plate 24 and the belt-like negative plate 26 via the belt-like separator 28 from their one end sides using a winding core. As shown in FIG. 2, therefore, one end portions (inner end portions) 36 and 38 of the positive plate 24 and the negative plate 26 are positioned on the center axis side of the electrode assembly 22, while the other end portions (outer end portions) 40 and 42 of the positive plate 24 and the negative plate 26 are positioned on the outer surface side of the electrode assembly 22. The negative plate 26 is longer than the positive plate 24, the negative inner end portion 38 is wound inward of the positive inner end portion 36 as seen from the radial direction of the electrode assembly 22, the negative outer end portion 42 is wound outward of the positive outer end portion 40 as seen from the radial direction of the electrode assembly 22. The negative inner end portion 38 extends over the positive inner end portion 36 in the circumferential direction of the electrode assembly 22 on the inner surface side of the positive plate 24 facing toward the center axis of the electrode assembly 22, while the negative outer end portion 42 extends over the positive outer end portion 40 in the circumferential direction of the electrode assembly 22 on the outer surface side of the positive plate 24 facing toward the outer surface of the electrode assembly 22. Therefore, the positive plate 24 is held by the negative plate 26 via the separator 28 from both radial sides over the entire lengthwise direction. The negative plate 26, not the separator 28, is wound around the outermost portion of the electrode assembly 22 and the negative plate 26 is electrically connected to the case 10 at the outermost portion of the electrode assembly 22. Because the winding core is removed from the electrode assembly 22 after winding, the electrode assembly 22 have a cavity 44, corresponding in shape to the winding core, in the center. Accordingly, the lateral cross-sectional area of the electrode assembly 22 is a value obtained by subtracting the cross-sectional area of the cavity 44 and the cross-sectional area of a clearance 45 formed between the electrode assembly 22 and the case 10 from the cross-sectional area of the interior of the case 10, as indicated by hatches in FIG. 3A. As a preferable mode of the battery, the percentage (electrodes cross-sectional area ratio) of a value obtained by dividing the lateral cross-sectional area of the electrode assembly 22 by a value obtained by subtracting the cross-sectional area of the cavity 44 from the cross-sectional area of the inner wall space of the case 10 or a lateral cross-sectional area indicated by hatches in FIG. 3B lies in a range of 90% to 100%.

Available as the separator 28 is, for example, a nonwoven fabric made of polyamide fibers or a nonwoven fabric made of polyolefin fibers, such as polyethylene or polypropylene, to which a hydrophilic functional group is given.

The positive plate 24 has a belt-like shape and a thickness of 0.95 mm or greater.

The thickness of the positive plate 24 is the thickness of the positive plate 24 inside the assembled battery and is the thickness in the radial direction measured on the lateral cross-sectional image of the battery taken an X-ray CT apparatus.

The positive plate 24, though not illustrated, includes a conductive positive substrate and a positive mixture supported by the positive substrate. The positive mixture includes positive active material particles, various kinds of additive particles for improving the characteristic of the positive plate 24, and a binder which binds the positive active material particles and additive particles to the positive substrate. A metal substrate having a conductive three-dimensional mesh-like frame, for example, can be used as the positive substrate. The frame of the metal substrate extends all over the positive plate 24, and the positive mixture is filled in pores formed by the frame.

The amount of the positive active material contained in the positive mixture of the positive plate 24 is preferably set in such a way that the volume energy density of the battery becomes equal to or more than 340 Wh/l. The volume energy density of the battery is acquired by dividing a value, which is obtained by multiplying the 0.2 C capacity of the battery by 1.2 V as an operational voltage, by the volume Vb of the battery. The 0.2 C capacity of the battery is defined by JIS C8708-1997, and is specifically the capacity when the battery is charged for sixteen hours with a current whose flow rate is equivalent to 0.1 C, is then stopped for one to four hours, is then discharged to the discharge end voltage of 1.0 V with a current whose flow rate is equivalent to 0.2 C at the ambient temperature of 20±5° C.

The positive active material, though not particularly restrictive, is nickel hydroxide particles for the battery is a nickel hydrogen secondary battery. The nickel hydroxide particles as the positive active material may have cobalt, zinc, cadmium or the like dissolved or may have the surface coated with a cobalt compound. Not particularly restrictive, besides yttrium oxide, a cobalt compound, such as cobalt oxide, metal cobalt or a cobalt hydroxide, a zinc compound, such as metal zinc, zinc oxide or zinc hydroxide, or a rare-earth compound, such as erbium oxide, may be used as the additive particles, and hydrophilic or hydrophobic polymer or the like may be used as the binder. Note that the positive plate 24 having nickel hydroxide as an active material filled in the nickel metal member is suitable for increasing the capacity of the battery.

Figure 4:
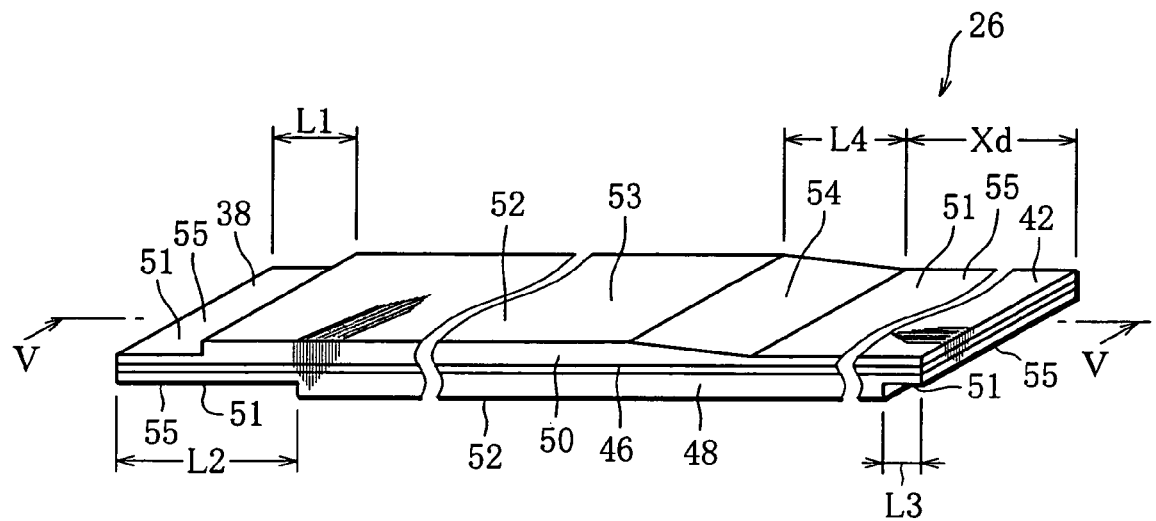
FIG. 4 is a perspective view showing a negative plate to be used in the battery in FIG. 1 in a developed state.
Figure 5:
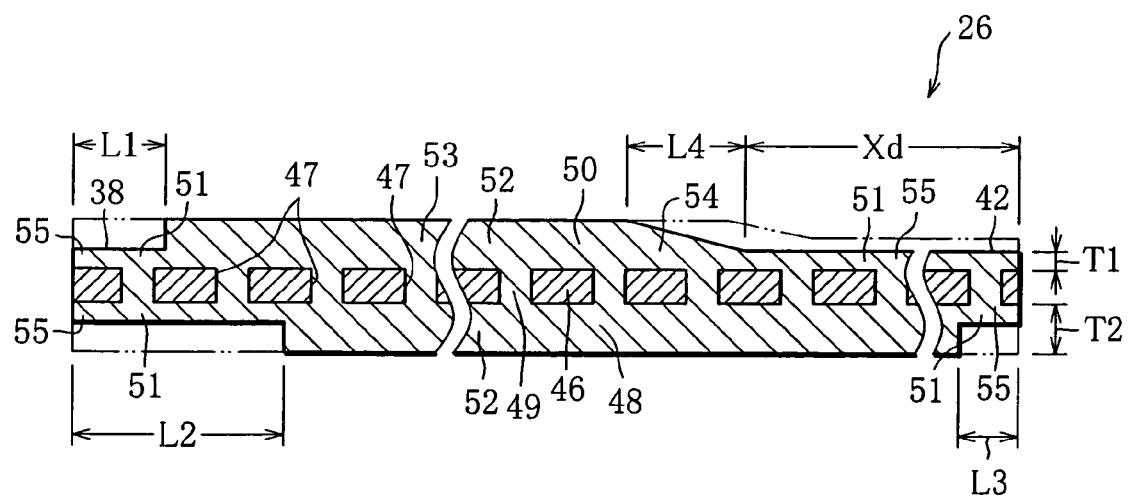
FIG. 5 is a cross-sectional view taken along line V-V in FIG. 4.

The negative plate 26 has a belt-like conductive negative substrate 46 as shown in FIGS. 4 and 5 in an developed form, and a negative mixture is supported by the negative substrate 46.

As the battery is a nickel hydrogen secondary battery, the negative mixture includes hydrogen absorbing alloy particles capable of absorbing and desorbing hydrogen as a negative active material, and a binder. The hydrogen absorbing alloy may be replaced with, for example, a cadmium compound to provide a nickel cadmium secondary battery. The negative active material is not particularly limited. It is to be noted however that a nickel hydrogen secondary battery is suitable for increasing the capacity of the battery. With the active material being hydrogen, because the capacity of the negative electrode is defined by the amount of the hydrogen absorbing alloy, the hydrogen absorbing alloy is also called "negative active material" in the invention.

The hydrogen absorbing alloy particles can be of any type as long as they can absorb hydrogen generated electrochemically in the alkaline electrolyte at the time of charging the battery and can easily desorb the absorbed hydrogen at the time of discharging. Available as such a hydrogen absorbing alloy is, for example, an $AB_5$-based alloy, such as $LaNi_5$ and $MmNi_5$ (where Mm is mesh metal), which is not particularly restrictive. Hydrophilic or hydrophobic polymer or the like can be used as the binder.

The negative substrate 46 is made of a metal sheet with a given thickness and through holes 47 are distributed all over the surface at predetermined locations. A punching metal, metal powder sintered substrate, an expanded metal and a nickel net or the like, for example, can be used as the material for the negative substrate 46. Particularly, a punching metal or a metal powder sintered substrate which has metal powders molded and then sintered is suitable for the negative substrate 46.

As the negative mixture is filled in the through holes 47 of the negative substrate 46 which is a sheet-like shape, the negative mixture is held in the form of a layer on both sides of the negative substrate 46. Hereinafter, the negative mixture filled in the through holes 47 is called a filler 49, the layer of the negative mixture which covers the inner surface of the negative substrate 46 and faces toward the center axis of the electrode assembly 22 is called "inner active material layer 48" or "inner layer 48" and the layer of the negative mixture which covers the outer surface of the negative substrate 46 and faces toward the radially outer periphery of the electrode assembly 22 is called "outer active material layer 50" or "outer layer 50".

Figure 6:
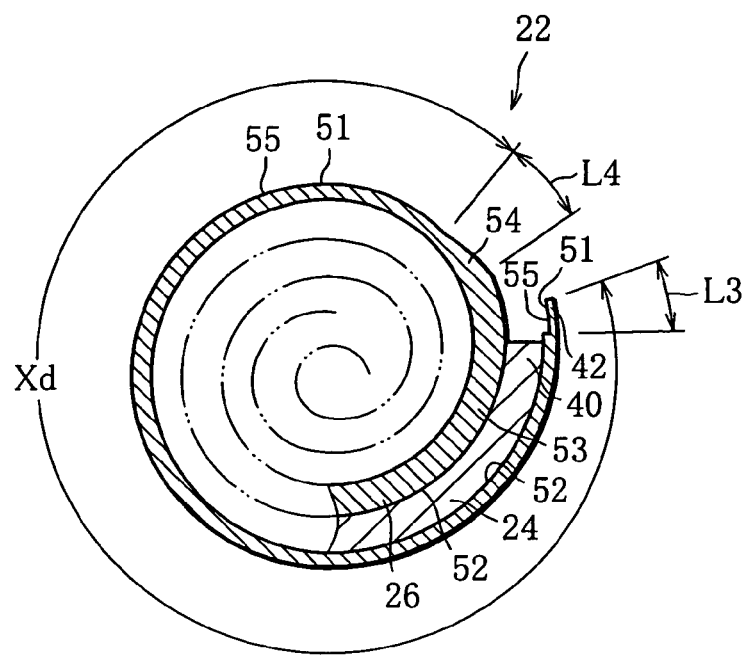
FIG. 6 is an exemplary diagram of the electrode assembly for explaining the overlapping relationship between the positive plate and negative plate on the outer end side.
Figure 7:
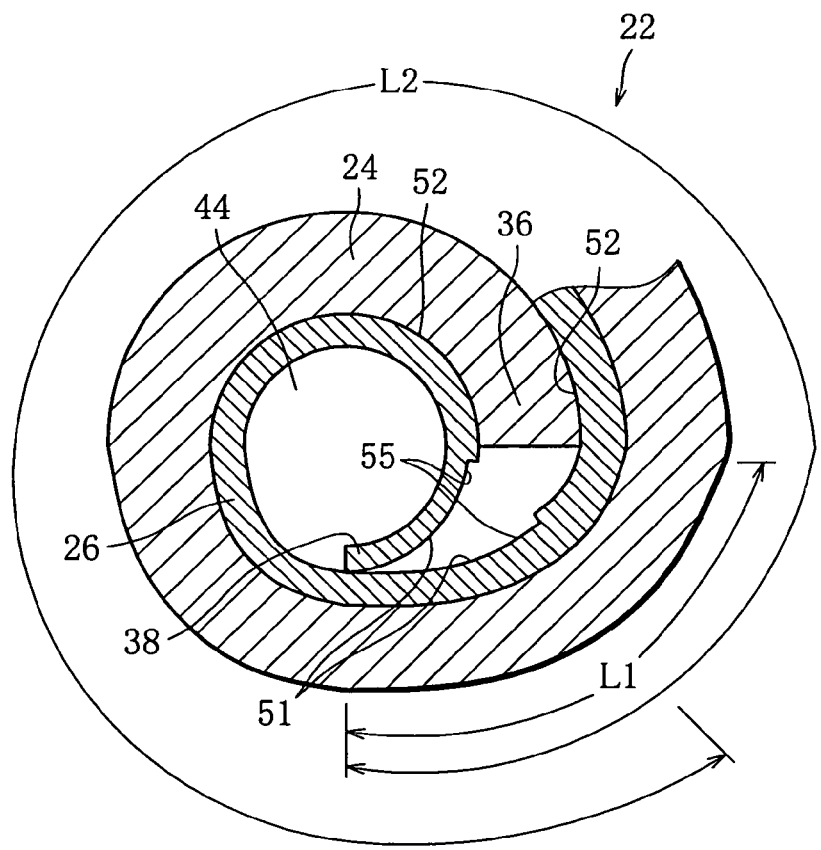
FIG. 7 is an exemplary diagram of a part of the electrode assembly for explaining the overlapping relationship between the positive plate and negative plate on the inner end side.

As exemplarily illustrated in FIGS. 6 and 7 with the separator 28 and negative substrate 46 omitted therefrom, the negative plate 26 has an area where the positive plate 24 is laid out on both sides via the separator 28, and also has an area where the positive plate 24 is not laid out via the separator 28 on those sides of the negative inner end portion 38 and the negative outer end portion 42. Referring also to FIG. 5, the inner layer 48 and the outer layer 50 have a non-overlapping portion 51 which does not overlap the positive plate 24 via the separator 28 adjoining to their own surfaces, and an overlapping portion 52 which overlaps the positive plate 24 via the separator 28 adjoining to their own surfaces.

The ratio of the total amount of the negative active material contained in the overlapping portions 52 of the inner layer 48 and the outer layer 50, which overlap the positive plate 24 via the separator 28, and the filler 49 distributed in an area of the negative substrate 46 that is covered by the overlapping portion 52 of the inner layer 48 and the outer layer 50 on at least one side thereof to the amount of the negative active material contained in the entire negative plate 26, i.e., the ratio of the opposing portion, is set in a range from 75% to 100%. As a preferable mode of the embodiment, 50% or more of the non-overlapping portion 51 of the inner layer 48 and the outer layer 50 is formed thin in such a way as that the thickness becomes equal to or less than half the thickness of the overlapping portion 52. This design allows the ratio of the opposing portion to be set in a range from 75% to 100%. Hereinafter, the area of the non-overlapping portion 51 which is formed thin is called "thin section 55".

More specifically, the outer layer 50 is formed thin over a length Xd from the negative outer end portion 42 on that side of the negative outer end portion 42 of the negative plate 26. The thin section 55 of the outer layer 50 is wound around the outermost portion of the electrode assembly 22 to contact the inner wall of the case 10. The inner layer 48 is formed thin over a length L3 from the negative outer end portion 42 in that area of the negative plate 26 which extends over the positive outer end portion 40 in the circumferential direction of the electrode assembly 22 on the radial outer surface side of the positive plate 24. The thin section 55 of the inner layer 48 overlaps the radially inward portion of the negative plate 26 via the separator 28. That is, the length L3 of the thin section 55 of the inner layer 48 is shorter than the length Xd of the thin section 55 of the outer layer 50 on that side of the negative outer end portion 42. On that side of the negative inner end portion 38, the thin section 55 is formed over a length L1 at the outer layer 50 in that area of the negative plate 26 which extends over the positive inner end portion 36 in the circumferential direction of the electrode assembly 22 on the radial inner surface side of the positive plate 24. The thin section 55 is formed over a length L2 at the inner layer 48 in that area of the negative plate 26 which extends over the positive inner end portion 36 in the circumferential direction of the electrode assembly 22 on the radial outer surface side of the positive plate 24. The thin section 55 of the outer layer 50 is positioned radially inward of the thin section 55 of the inner layer 48 via the separator 28, and the cavity 44 is present there. That is, the length L2 of the thin section 55 of the inner layer 48 is longer than the length L1 of the thin section 55 of the outer layer 50.

For the sake of convenience, the negative substrate 46 is omitted, the thin section 55 of the inner layer 48 on that side of the negative outer end portion 42 are omitted, and the thin sections 55 of the inner and outer layers 48 and 50 on that side of the negative inner end portion 38 are omitted in FIG. 2.

Accordingly, the negative plate 26 has a negative main portion 53 with a given thickness between the negative inner end portion 38 and the negative outer end portion 42. Both lengthwise sides of the negative main portion 53, i.e., the negative inner end portion 38 and the negative outer end portion 42, are thinner than the negative main portion 53.

The thicknesses of the negative main portion 53, the negative inner end portion 38 and the negative outer end portion 42 are their thicknesses actually measured with a micrometer after the battery is disassembled to remove the negative plate 26 and the removed negative plate 26 is dried. The thicknesses of the thin section 55 at the inner and outer layers 48 and 50 are the thicknesses that are acquired from the difference between the measured thickness of the negative inner end portion 38 of the dried negative plate 26 and the thicknesses measured after the thin section 55 is scraped off. The thicknesses of the overlapping portion 52 at the inner and outer layers 48 and 50 are the thicknesses that are acquired from the difference between the measured thickness of the negative inner end portion 38 and the thicknesses measured after the overlapping portion 52 is scraped off. The lengths of the negative main portion 53, the negative inner end portion 38 and the negative outer end portion 42 are likewise their lengths actually measured with a ruler or the like after the battery is disassembled to remove the negative plate 26 and the removed negative plate 26 is dried.

Figure 8:
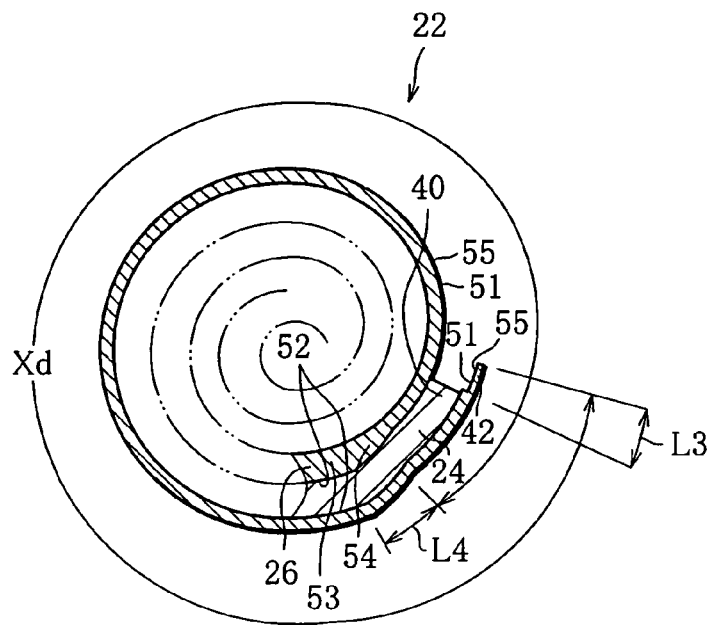
FIG. 8 is another exemplary diagram of the electrode assembly for explaining the overlapping relationship between the positive plate and negative plate on the outer end side.

The negative plate 26 has a negative boundary portion 54 between the negative main portion 53 and the thin negative outer end 42 with a constant thickness. The negative boundary portion 54 has a length L4 and a change in thickness as seen in the lengthwise direction. The thickness of the outer layer 50 at the negative boundary portion 54 gradually decreases from a thickness T2 to a thickness T1 at an approximately given change ratio toward the negative outer end portion 42 from the negative main portion 53. It is preferable that the negative boundary portion 54, when wound as the electrode assembly 22, should be positioned at positions different from those of the positive outer end portion 40 as seen in the circumferential direction of the electrode assembly 22. As exemplarily illustrated in FIG. 6, the negative main portion 53 is laid on the radially inward of the positive outer end portion 40 via the separator 28 in the embodiment. It is to be noted however that, though not particularly restrictive, the circumferential positions of the negative boundary portion 54 and the positive outer end portion 40, and the positive outer end portion 40 may extend over the negative boundary portion 54 in the circumferential direction of the electrode assembly 22 as exemplarily illustrated in FIG. 8.

A predetermined amount of alkaline electrolyte (not shown) is injected into the case 10 retaining the electrode assembly 22 and the charge/discharge reaction progresses between the positive plate 24 and the negative plate 26 via the alkaline electrolyte contained in the separator 28. The amount of injection of the alkaline electrolyte or the volume, Ve, of the alkaline electrolyte contained in the battery is set in such a way that the ratio with respect to the 0.2 C capacity, i.e., the capacity-electrolyte ratio, is set equal to or less than 0.85 ml/Ah or less from the relationship between the battery capacity and the volume of the case 10.

Though not particularly restrictive, the types of the alkaline electrolyte available are, for example, a sodium hydroxide solution, a lithium hydroxide solution, a potassium hydroxide solution, and a solution or the like in which two ore more of the former three solutions are mixed. The concentration of the alkaline electrolyte is not particularly limited, and, for example, an alkaline electrolyte of 7N can be used as well.

While the battery can be manufactured by using an ordinary method, one example for each of the fabrication method of the negative plate 26 and a winding method for the electrode assembly 22 will be discussed below.

In fabricating the negative plate 26, first, a punching metal to be the negative substrate 46 and the slurry of the negative mixture are prepared and the slurry is applied to the punching metal in such a way that the applied slurry becomes thinner at the portion which will be the thin section 55 and the portion which will be the overlapping portion 52 becomes thick, and is then dried. Next, the punching metal holding the dried negative mixture is put through the gap between a pair of rolls and is compressed from both thicknesswise sides. At the time of rolling, the size of the gap is changed while keeping the pressing force of the rolls constant, thereby making the portion to be the thin section 55 thinner than the portion to be the overlapping portion 52. Then, the rolled metal is cut to a predetermined size, thereby providing the belt-like negative plate 26. The length L4 of the negative boundary portion 54 can be adjusted by controlling the thickness of the slurry to be applied or the pressing force of the rolls.

Figure 9:
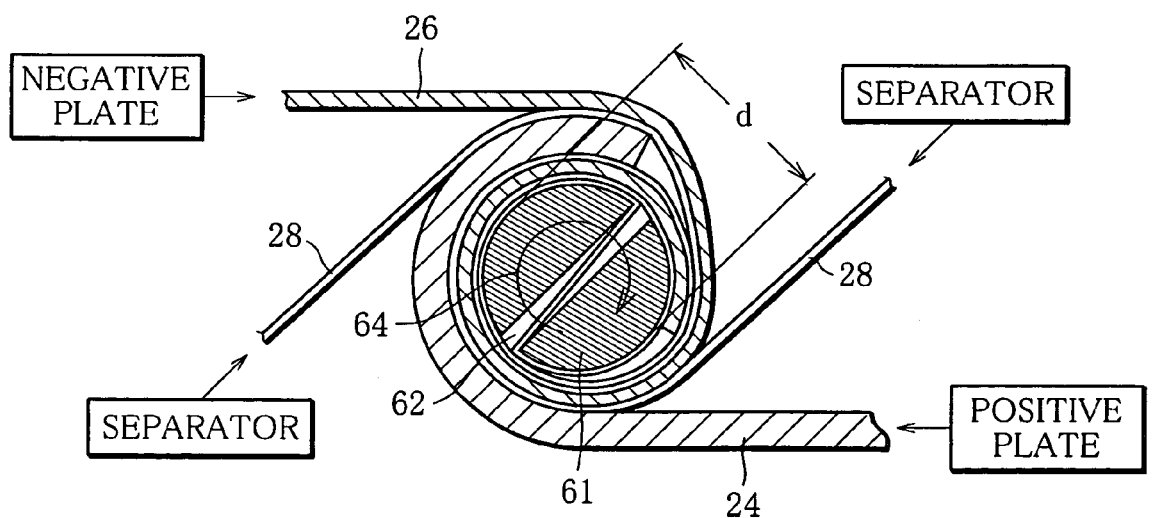
FIG. 9 is an explanatory diagram for a method of winding the electrode assembly to be used in the battery in FIG. 1.

The electrode assembly 22 are formed by winding the positive plate 24, the negative plate 26 and the separator 28 using the winding core 61 as shown in FIG. 9. Formed in the cylindrical winding core 61 is a slit 62 which extends in the axial direction of the winding core 61 and bisects the winding core 61 radially. The electrode assembly 22 are wound by turning the winding core 61 in the direction indicated by an arrow 64 in the diagram and continuously feeding the positive plate 24 and the negative plate 26 and the separator 28 with respect to the winding core 61, with the separator 28 held in the slit 62. At this time, the outside diameter, d, of the winding core 61 is not particularly restrictive. In the embodiment, however, the electrode assembly 22 are wound using the winding core 61 whose outside diameter d lies in a range from 0% to 30% of the outside diameter D (see FIG. 2) of the case 10 as a preferable mode.

As the thickness of the positive plate 24 is 0.95 mm or greater, the battery with the structure is suitable for increasing the capacity. Particularly, the battery which archives a volume energy density of 340 Wh/l or higher is more suitable for a higher capacity.

In addition, in the battery, the ratio of the opposing portion is set in a range from 75% to 100%, and the ratio of the total amount of the hydrogen absorbing alloy contained in the non-overlapping portions 51 and filler 49 distributed in the area of the negative substrate 46 that is covered by the non-overlapping portions 51 on both sides thereof, which demonstrate a small contribution to the battery reaction, to the amount of the hydrogen absorbing alloy in the entire negative plate 26, i.e., the ratio of the non-opposing portion of the negative plate, is limited to a range from 0% to 25%, thereby securing the amount of the negative active material contained in the overlapping portion 52 that demonstrates a large contribution to the battery reaction.

Even if the ratio of the negative capacity of the entire negative plate 26 to the positive capacity is below 1.41 when the negative non-opposing portion ration is 29%, for example, the opposing capacity ratio is 1.00 or greater. In the battery, therefore, the battery reaction progresses uniformly over the entire positive plate 24 at the time of charging, so that early local degradation of the active material is prevented and delay of the oxygen-gas reducing reaction is suppressed. This prevents leakage of the alkaline electrolyte which is caused by the actuation of the relief valve resulting from an increase in the inner pressure, thereby suppressing shortening of the battery life. The opposing capacity ratio is the ratio of the sum of the negative capacities of the overlapping portion 52 and the filler 49 distributed in the area of the negative substrate 46 that is covered by the overlapping portion on at least one side thereof to the positive capacity.

As a preferable mode of the battery, the thickness of the thin section 55 is set to half the thickness of the overlapping portion in order to set the ratio of the opposing portion in a range from 75% to 100%. When the thickness of the thin section 55 is set to 0 mm, i.e., when the negative substrate 46 is exposed, however, the presence of the exposed portion delays the oxygen-gas reducing reaction, thereby reducing the battery life. It is therefore preferable that the negative substrate 46 should not be exposed even at the non-overlapping portion 51.

According to the battery, even if the capacity-electrolyte ratio is 0.85 ml/Ah or less, the ratio of the opposing portion is set in a range from 75% to 100%, so that the amount of the alkaline electrolyte contained in the portion where the positive plate 24 and the negative plate 26 overlap each other via the separator 28. Therefore, the battery prevents the electric resistance between the positive plate 24 and the negative plate 26 from getting higher, thus preventing a reduction in discharge characteristic. A reduction in low-temperature continuous charge characteristic is also prevented.

According to the battery, as the outside diameter d of the winding core 61 to be used in winding the electrode assembly 22 is 30% or less than the outside diameter D of the case 10, shortening of the battery life is suppressed more reliably.

When the ratio of the inside diameter of the cavity 44 of the electrode assembly 22 to the outside diameter D of the case 10 exceeds 30%, an oxygen gas produced in the positive plate 24 is likely to remain in the cavity 44 at the time of charging, delaying the oxygen-gas reducing reaction in the negative plate 26. When the oxygen-gas reducing reaction is delayed, the inner pressure rises, actuating the relief valve so that the alkaline electrolyte leaks out, reducing the battery life. In this respect, in the battery, while the electrode assembly 22 are wound by using the winding core 61 having the outside diameter d equal to or smaller than 30% of the outside diameter D of the case 10 to thereby make the cavity 44 near the center axis of the electrode assembly 22 smaller, the space for temporary storage of the oxygen gas, which corresponds to the reduction in cavity 44, is dispersed inside the battery. This permits efficient progression of the oxygen-gas reducing reaction using the whole negative plate 26, preventing the oxygen-gas reducing reaction from being delayed. Accordingly, the battery prevents leakage of the alkaline electrolyte which would otherwise be originated from the actuation of the relief valve caused by a rise in inner pressure, and thus suppresses a reduction in battery life more surely.

Because the ratio of the cross-sectional area of the electrode assembly is set equal to or greater than 90% in the battery, an increase in inner resistance is further prevented.

When the ratio of the cross-sectional area of the electrode assembly 22 is low, the compressing force applied to the electrode assembly 22 by the inner wall of the case 10 from both radial sides becomes smaller, so that the degree of constriction of the electrode assembly 22 becomes lower. When the positive lead 30 whose end portion is welded to one side of the positive plate 24 is bent so that the lid plate 14 is placed in the opening edge of the case with the a low degree of constriction, a large load is applied to the welded place of the positive plate 24 where the end portion of the positive lead 30 is welded. Then, the positive plate 24 breaks at the welded place, resulting in an increased inner resistance. In this respect, the ratio of the cross-sectional area of the electrode assembly 22 in the battery is set equal to or greater than 90% to increase the compressing force applied to the electrode assembly 22, thereby making the degree of constriction of the electrode assembly 22 larger. This allows the welded place of the positive plate 24 to be held pressed by the negative plate 26 from both radial sides via the separator 28. This prevents deformation of the positive plate 24 at the welded place at the time the positive lead 30 is bent. As a result, breaking of the positive plate 24 in the battery at the welded place is prevented, thereby preventing an increase in inner resistance.

The invention is not limited to the embodiment but can be modified in various forms. For example, the lengths Xd, L1, L2 and L3 and the thickness T1 of the thin sections 55 at the negative inner end portion 38 and the negative outer end portion 42 may be different from one another. As indicated by a two-dot chain line in FIG. 5, the non-overlapping portion 51 of the inner layer 48 and the outer layer 50 of the negative inner end portion 38 and the non-overlapping portion 51 of the inner layer 48 of the negative outer end portion 42 may not be formed thin.

In the embodiment, to set the ratio of the opposing portion in a range from 75% to 100%, 50% or more of the entire non-overlapping portion 51 of the inner layer 48 and the outer layer 50 is formed as the thin section 55 whose thickness is equal to or less than half the thickness of the overlapping portion 52. Alternatively, the density of the negative active material in the inner layer 48 and the outer layer 50, not the thickness, is changed to set the amount of the hydrogen absorbing alloy contained in the non-overlapping portion 51 per unit area equal to or less than half the amount of the hydrogen absorbing alloy contained in the overlapping portion 52 per unit area.

Examples 1 to 7 and Comparative Examples 1 and 2

1. Assembly of Battery

Hundred AA-size cylindrical nickel hydrogen secondary batteries were assembled for each of Examples 1 to 7 using the positive plate, the negative plate and the separator which had shapes (lengths, widths and thicknesses) given in Table 1. The thicknesses of the positive plate are shown in Table 3.

TABLE 1

|  | Length (mm) | Width (mm) | Thickness (mm) |
| --- | --- | --- | --- |
| Positive plate | 70 | 43.5 | see Table 3 |
| Negative plate | 115 | 43.5 | 0.40 |
| Separator | 230 | 43.5 | 0.10 |

The thickness and area of the thin section 55 were changed from one embodiment to another. Table 2 shows the ratio of the area of the thin section 55 to the total area of the inner layer 48 and the outer layer 50, the ratio of the area of the thin section 55 to the area of the non-overlapping portion 51, and the ratio of the thickness of the thin section 55 to the thickness of the overlapping portion 52 in each of the examples. Table 3 shows the 0.2 C capacity, the thickness of the positive plate, the capacity ratio, the opposing capacity ratio and the ratio of the opposing portion.

As each of Comparative Examples 1 and 2, hundred cylindrical nickel hydrogen secondary batteries with the same structure as that of Examples 1 and 3, except that the non-overlapping portion 51 was not made thin at all, were assembled.

2. Evaluation of Battery Life

The batteries of Examples 1 to 7 and Comparative Examples 1 and 2 were initially charged and discharged first to measure the masses of the batteries. Then, each battery was subjected to 200 cycles of charging/discharging in each of which the battery was charged to $-\Delta V$ with the current with a flow rate equivalent to 1 C, rested for one hour and then discharged with the current with a flow rate equivalent to 1 C until the battery voltage reached 1.0 V. After the discharging in the 200th cycle, the mass of each battery was measured to acquire the amount of the battery mass (electrolyte) reduced in 200 cycles. The obtained amount of reduction for each of the examples and comparative example was taken as a reciprocal number which is shown in Table 3 with the reciprocal of the amount of reduction for Comparative Example 1 taken as 100 as an index. The amount of reduction is the average value for hundred batteries.

TABLE 2

| | Thin sections | | |
|---|---|---|---|
| | Area | | |
| | Ratio to total area of inner and outer layers (%) | Ratio to area of non-overlapping portion (%) | Thickness Ratio to thickness of overlapping portion |
| Comparative Example 1 | 0 | 0 | 10/10 |
| Example 1 | 18 | 62 | 5/10 |
| Example 2 | 19 | 66 | 1/10 |
| Example 3 | 29 | 100 | 1/10 |
| Comparative Example 2 | 0 | 0 | 10/10 |
| Example 4 | 19 | 66 | 1/10 |
| Example 5 | 29 | 100 | 3/10 |
| Example 6 | 29 | 100 | 0.1/10 |
| Example 7 | 29 | 100 | 0/10 |

TABLE 3

| | Battery capacity (mAh) | Thickness of positive plate (mm) | Capacity-electrolyte ratio (ml/Ah) | Capacity ratio | Opposing ratio | Ratio of the opposing portion (%) | Battery life |
|---|---|---|---|---|---|---|---|
| Comparative Example 1 | 2100 | 1.03 | 0.88 | 1.45 | 1.03 | 71 | 100 |
| Example 1 | 2100 | 1.03 | 0.88 | 1.45 | 1.13 | 78 | 115 |
| Example 2 | 2100 | 1.03 | 0.88 | 1.45 | 1.25 | 86 | 140 |
| Example 3 | 2100 | 1.03 | 0.88 | 1.45 | 1.40 | 97 | 190 |
| Comparative Example 2 | 2300 | 1.07 | 0.78 | 1.30 | 0.93 | 71 | 20 |
| Example 4 | 2300 | 1.07 | 0.78 | 1.30 | 1.12 | 86 | 100 |
| Example 5 | 2300 | 1.07 | 0.78 | 1.30 | 1.16 | 90 | 130 |
| Example 6 | 2300 | 1.07 | 0.78 | 1.30 | 1.30 | 99.7 | 165 |
| Example 7 | 2300 | 1.07 | 0.78 | 1.30 | 1.30 | 100 | 150 |

The following are apparent from Table 2 and Table 3.

Examples 1 to 7 whose ratios of the opposing portion are 75% or greater have longer battery lives than Comparative Examples 1 and 2 whose ratios of the opposing portion are less than 75%.

Comparative Example 2 with a capacity of 2300 mAh demonstrates a significant reduction in battery life as compared with Comparative Example 1 with a capacity of 2100 mAh. By way of contrast, the battery lives of Examples 4 to 7 with a capacity of 2300 mAh are equal to or longer than that of Comparative Example 1 with a lower capacity. It is apparent that setting the ratio of the opposing portion to 75% or greater dramatically improves the battery life.

Example 7 in which the negative substrate 46 is exposed at the non-overlapping portion 51 has a shorter battery life than Example 6 in which the inner layer 48 and the outer layer 50 are slightly left at the non-overlapping portion 51.

What is claimed is:

1. A cylindrical alkaline storage battery comprising:
a cylindrical case having a conductivity and an outside diameter within a range from 13.5 mm to 14.5 mm; and
an electrode assembly contained in said case together with an alkaline electrolyte, said electrode assembly including a negative plate and a positive plate, said negative plate and positive plate being spirally wound with a separator intervened therebetween, said negative plate forming an outermost portion of said electrode assembly and being in contact with an inner wall of said case, wherein
said positive plate has a thickness of 0.95 mm or greater, said negative plate includes:
a negative substrate made of a metal conductive sheet and having a plurality of through holes, an inner surface and an outer surface in view of a radial direction of the electrode assembly, and
a negative active material layer deposited on the negative substrate and containing a negative active material, the negative active material layer including,
an inner layer covering the inner surface of the negative substrate and having an overlapping portion overlapping said positive plate adjacent thereto via said separator,
an outer layer covering the outer surface of the negative substrate and having an overlapping portion, the overlapping portion overlapping said positive plate adjacent thereto via said separator, and a non-overlapping portion which does not overlap the positive plate via the separator and has a thin section, the thin section being thinner than the overlapping portion thereof and wound at an outermost part of the electrode assembly, and
a filler filled in the through holes of the negative substrate, the filler having a filling portion distributed in an area of the negative substrate that is covered by one of the overlapping portions of the inner layer and the outer layer on at least one side thereof
a total amount of the negative active material contained in the overlapping portions of the inner and outer layers and the filling portion of the filler ranges from 75% to 100% of a total amount of the negative active material contained in said negative plate; and,
a ratio of the sum of the negative capacities of the overlapping portion and the filler distributed in the area of the negative substrate that is covered by the overlapping portion on at least one side thereof to the positive capacity is equal to 1.00 or greater.

2. The battery according to claim 1, wherein the inner layer has a non-overlapping portion which does not overlap said positive plate via said separator, and an area of 50% or more of the non-overlapping portions of the inner and outer layers has a thickness equal to or less than half a thickness of the overlapping portions of the inner and outer layers.

3. The battery according to claim 2, wherein a volume of the alkaline electrolyte is such that a capacity-electrolyte ratio obtained by dividing the volume of said alkaline electrolyte by a 0.2 C capacity is 0.85 ml/Ah or less.

4. The battery according to claim 3, wherein said electrode assembly has a cavity in a center thereof, the cavity having an inside diameter equal to or less than 30% of the outside diameter of said case.

5. The battery according to claim 4, wherein said case has an open end and a lid plate fixed to said open end; and
said battery further comprises a positive lead laid out between said electrode assembly and said lid plate, the positive lead having an end portion welded to one side of said positive plate and a bent portion bent between said electrode assembly and said lid plate, wherein
a ratio between a first value and a second value is between 90:100 and 1:1, the first value being obtained by subtracting a lateral cross-sectional area of the cavity from a cross-sectional area of said electrode assembly, the second value being obtained by subtracting the cross-sectional area of said cavity from a cross-sectional area of inner space of said case.

6. The battery according to claim 1, wherein the inner layer has a non-overlapping portion which does not overlap said positive plate via said separator, and
an area of 50% or more of the non-overlapping portions of the inner and outer layers contains an amount of the negative active material per unit area equal to or less than half an amount of the negative active material contained in the overlapping portions of the inner and outer layers per unit area.

7. The battery according to claim 1, wherein a volume of the alkaline electrolyte is such that a capacity-electrolyte ratio obtained by dividing the volume of said alkaline electrolyte by a 0.2 C capacity is 0.85 ml/Ah or less.

8. The battery according to claim 1, wherein said electrode assembly has a cavity in a center thereof, the cavity having an inside diameter equal to or less than 30% of the outside diameter of said case.

9. The battery according to claim 1, wherein said case has an open end and a lid plate fixed to said open end; and
said battery further comprises a positive lead laid out between said electrode assembly and said lid plate, the positive lead having an end portion welded to one side of said positive plate and a bent portion bent between said electrode assembly and said lid plate, wherein
a ratio between a first value and a second value is between 90:100 and 1:1, the first value being obtained by subtracting a lateral cross-sectional area of the cavity from a cross-sectional area of said electrode assembly, the second value being obtained by subtracting the cross-sectional area of said cavity from a cross-sectional area of inner space of said case.

10. The battery according to claim 1, wherein said negative plate includes a hydrogen absorbing alloy as the negative active material, and
said positive plate includes a metal substrate having a conductive three-dimensional frame and nickel hydroxide particles, as a positive active material, filled in the metal substrate.

11. The battery according to claim 6, wherein said negative plate includes a hydrogen absorbing alloy as the negative active material, and
said positive plate includes a metal substrate having a conductive three-dimensional frame and nickel hydroxide particles, as a positive active material, filled in the metal substrate.

12. The battery according to claim 7, wherein said negative plate includes a hydrogen absorbing alloy as the negative active material, and
said positive plate includes a metal substrate having a conductive three-dimensional frame and nickel hydroxide particles, as a positive active material, filled in the metal substrate.

13. The battery according to claim 8, wherein said negative plate includes a hydrogen absorbing alloy as the negative active material, and
said positive plate includes a metal substrate having a conductive three-dimensional frame and nickel hydroxide particles, as a positive active material, filled in the metal substrate.

14. The battery according to claim 9, wherein said negative plate includes a hydrogen absorbing alloy as the negative active material, and
said positive plate includes a metal substrate having a conductive three-dimensional frame and nickel hydroxide particles, as a positive active material, filled in the metal substrate.

* * * * *